(12) United States Patent
MacKarvich

(10) Patent No.: US 7,028,813 B2
(45) Date of Patent: Apr. 18, 2006

(54) LOW TEMPERATURE DISC BRAKE

(76) Inventor: Charles J. MacKarvich, 5901 Wheaton Dr., Atlanta, GA (US) 30336

( * ) Notice: Subject to any disclaimer, the term of this patent is extended or adjusted under 35 U.S.C. 154(b) by 0 days.

(21) Appl. No.: 10/860,925

(22) Filed: Jun. 4, 2004

(65) Prior Publication Data

US 2005/0269169 A1  Dec. 8, 2005

(51) Int. Cl.
*F16O 55/08* (2006.01)

(52) U.S. Cl. .................. 188/72.1; 188/71.6; 188/71.1; 188/71.4

(58) Field of Classification Search ............... 188/71.1, 188/71.4, 71.9, 72.1, 72.4, 72.7, 72.8, 73.1, 188/71.6, 71.8
See application file for complete search history.

(56) References Cited

U.S. PATENT DOCUMENTS

| | | | |
|---|---|---|---|
| 3,554,336 A * | 1/1971 | Crossman | 188/71.8 |
| 3,684,061 A * | 8/1972 | Ogawa et al. | 188/73.37 |
| 4,572,334 A | 2/1986 | Villata | |
| 4,581,985 A | 4/1986 | Villata | |
| 5,031,511 A | 7/1991 | Villata | |
| 5,046,404 A | 9/1991 | Schnorenberg, Jr. | |
| 5,484,041 A | 1/1996 | Cadaret et al. | |
| 5,660,253 A * | 8/1997 | Rike | 188/72.4 |
| 5,713,435 A * | 2/1998 | Schneider et al. | 188/71.6 |
| 5,826,686 A | 10/1998 | Rike | |

* cited by examiner

Primary Examiner—Melanie Torres
(74) Attorney, Agent, or Firm—Thomas, Kayden, Horstemeyer & Risley, LLP

(57) ABSTRACT

The disc brake caliper (26) has a stainless steel drive element (62) that faces the brake fluid and an aluminum contact element (64) received in the drive element, protruding therefrom so as to engage and move the brake pad (38) into frictional engagement with the vented rotor (40).

18 Claims, 2 Drawing Sheets

LOW TEMPERATURE DISC BRAKE

FIELD OF INVENTION

This invention concerns a trailer or other wheel mounted vehicle that includes disc brakes. More particularly, the invention concerns the construction of the actuator piston that urges the brake pads into frictional contact with the rotor of the brake.

BACKGROUND

Disc brakes for trailers and other wheel mounted vehicles typically operate under rugged and demanding conditions, such as in very hot or in very cold environments, over rough terrain, and on steep inclines, all of which require the brakes to be capable of slowing and stopping the trailer on demand. The frequent and prolonged use of brakes tends to generate heat, particularly at the brake pads and rotor where the pads apply friction to the rotor. The heat can be transmitted throughout the other parts of the brake assembly, including to the brake line where the brake fluid is used to operate the brake pads. When the brakes become extremely hot, there is some likelihood that the brake fluid will boil, changing from liquid to a vapor, tending to cause vapor lock in the brake line. This tends to significantly reduce the ability of the brake system to properly apply the brake pads to the brake rotor.

Another problem specifically applies to boat trailers that transport boats to and from launching sites at lakes, oceans, etc. The trailer with a boat mounted thereon is backed into the water, usually with the wheels and brakes of the trailer becoming submerged in the water. Usually this function is performed after the boat has been transported from a storage site to a launch site, which on some occasions may be many miles during which the brakes become hot. When the trailer is backed into the water and the hot brakes are submerged, the colder water tend to rapidly cool the brakes. The rapid cooling of the brakes tends to reduce the internal pressures within the cavities of the brakes, tending to draw water from the lake, etc. into the parts of the brakes. The water accumulated inside the brake tends to reduce the ability of the brake to apply proper force against the rotor to reduce the speed of or stop the rotation of the rotor. Moreover, the presence of water in a brake assembly tends to deteriorate the parts of the brake assembly contacted by the water.

In the past, various solutions have been attempted to avoid overheating of brakes. For example, the rotors of disc brakes have been modified by forming vented rotors, by the placement of a pair of brake rotors in parallel, side-by-side but spaced apart configuration, with connectors positioned between the rotors. This provides two separate surfaces against which the brake pads can operate, and also provides an increased flow of air about all surfaces of the brake rotors by the connectors functioning as a fan that propels air between the rotors. Also, the rotors can be formed with strategically placed holes that do not interfere with the application of the brake pads against the rotor, but which enhance the flow of air through the rotors.

Another overheating prevention approach is to utilized insulation material between the brake pads and the actuator, to limit the amount of heat transfer from the rotor to the pads, from the pads to the brake actuator and the brake fluid within the brake actuator.

While the above noted and other cooling features have been utilized in the past, there is still a need to provide a durable and reliable solution to the problem of overheating brakes, particularly brakes of the type used on vehicles that submerge their wheels in water from time to time.

SUMMARY OF THE INVENTION

Briefly described, the present invention comprises a disc brake caliper with a low temperature transfer actuator that reduces the amount of heat that is transferred from the rotor of the wheel to the actuator housing and to the brake fluid. The caliper is mounted in a conventional manner to the axle of the wheel, with its brake pads straddling the rotor, and the actuator is urged by the pressure from the brake fluid into engagement with the rotor. The rotor can be a vented rotor or a single disc rotor.

The actuator is formed of a bimetallic piston, with one of the metals having a high temperature transfer rate arranged for engagement against the brake pads and the other element formed of a low temperature transfer metal that is engaged by brake fluid. The heat from the rotor and brake pads is transferred readily to the high temperature transfer rate metal, and this metal is exposed to the air turbulence about the brake, tending to transfer the heat into the air, thus avoiding the transfer of heat toward the brake fluid and the actuator housing. This tends to significantly reduce the likelihood of overheating the brakes and the undesirable results of excessive wear, the boiling of brake fluid, and the suction of water into the brakes, as described above.

In the embodiment disclosed herein, the high temperature transfer metal of the actuator is formed of aluminum and the low temperature transfer metal is stainless steel. Other metal combinations can be used, as may be desired.

In the embodiment disclosed herein, the bimetallic actuator is a piston assembly having a contact element that engages the brake pads and a drive element that bears against the contact element and which, in turn, is driven by the brake fluid to urge the contact element into engagement with the rotor of the brake.

More particularly, the drive element is cup-shaped, with the base of the cup facing the brake fluid, and the contact element is cylindrically shaped and received within the cavity of the cup of the drive element. This leaves the inside, cylindrical surface of the contact element open for the circulation of air and, therefore, for rapid extracting of heat from the contact element.

While a specific structural arrangement is described hereinafter, it should be understood that other shapes of the structures can be utilized without departing from the spirit and scope of the invention.

Thus, it is an object of this invention to provide an improved disc brake assembly that reduces the likelihood of overheating of the brakes.

Another object of this invention is to provide an improved brake actuator for a disc brake assembly, for engaging and decreasing the speed of rotation of a rotor of a wheel.

Another object of this invention is to provide a disc brake assembly that is inexpensive to construct, which is durable, and which reliably functions to decrease and stop the rotation of the wheel of a vehicle.

Other objects, features and advantages of the present invention will become apparent upon reading the following specification, when taken in conjunction with the accompanying drawings.

DETAILED DESCRIPTION

Figure 1:
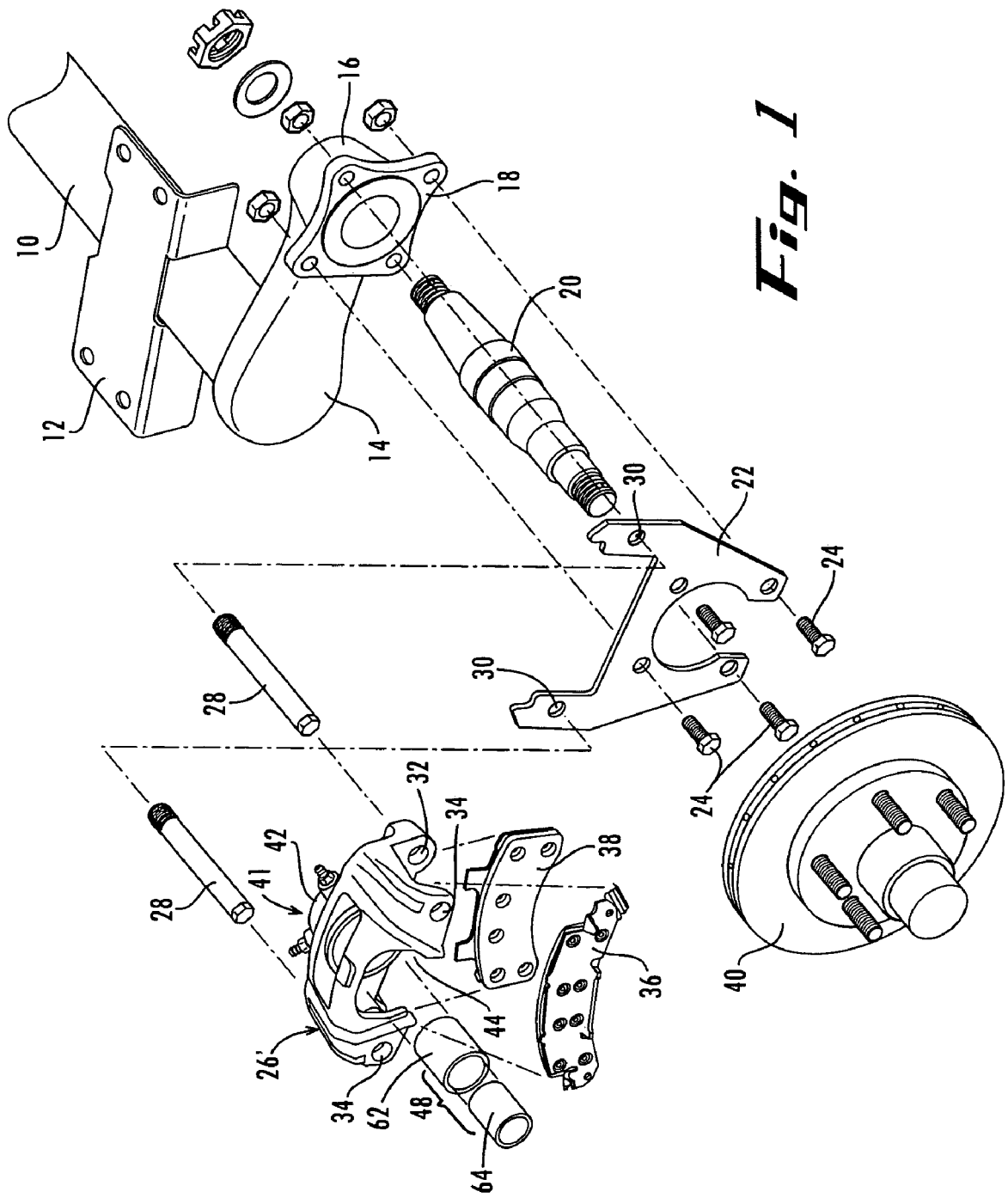
FIG. 1 is an expanded perspective illustration of a disc brake embodying the present invention.

Referring now in more detail to the drawings, in which like numerals indicate like parts throughout the several views, FIG. 1 shows an expanded view of a torsion axle and a disc brake caliper mounted thereto. The axle 10 extends across the trailer and is mounted thereto by conventional axle mounts 12, and the torsion arms are mounted to the ends of the axle as shown by torsion arm 14 and extend at right angles from the axle. A bearing 16 is formed at the distal end of each torsion arm, and a mounting flange 18 surrounds the bearing 16. The wheel axle 20 is mounted in the bearing 16 in the conventional way. A mounting bracket 22 is rigidly mounted to the mounting flange 18 by conventional bolts 24.

Brake caliper 26 is mounted to mounting bracket 22 by means of mounting pins 28 extending through the support openings 30 at the top of the mounting bracket 22 and through the aligned openings 32 and 34 of the brake caliper 26.

Brake pads 36 and 38 are received within the caliper, as shown by the dash lines of FIG. 1. The brake pads each have a high friction material 38 that is to be applied to the facing surface of the rotor 40 and a rigid backing plate 39 that faces the actuator. The backing plate of the brake pad is made of steel.

The brake caliper is mounted about the rotor 40, at the periphery of the rotor, with the brake pads 36 and 38 straddling the rotor. The brake caliper 26 is movable along the length of positioning pins 28, and the brake pads 36 and 38 are loosely held by the caliper in their respective positions adjacent the rotor.

Caliper 26 includes an actuator 41 that has its actuator housing 42 formed as part of the caliper and positioned on one side of the brake pads, and an opening 44 is located in the caliper opposite to actuator housing 42. Bimetallic piston 48 is positioned in the actuator housing. Typically, the bimetallic piston 48 will be placed in the actuator housing 42 before the brake pads are mounted in the caliper and before the caliper is mounted to the mounting bracket 22 about the rotor 40.

Figure 2:
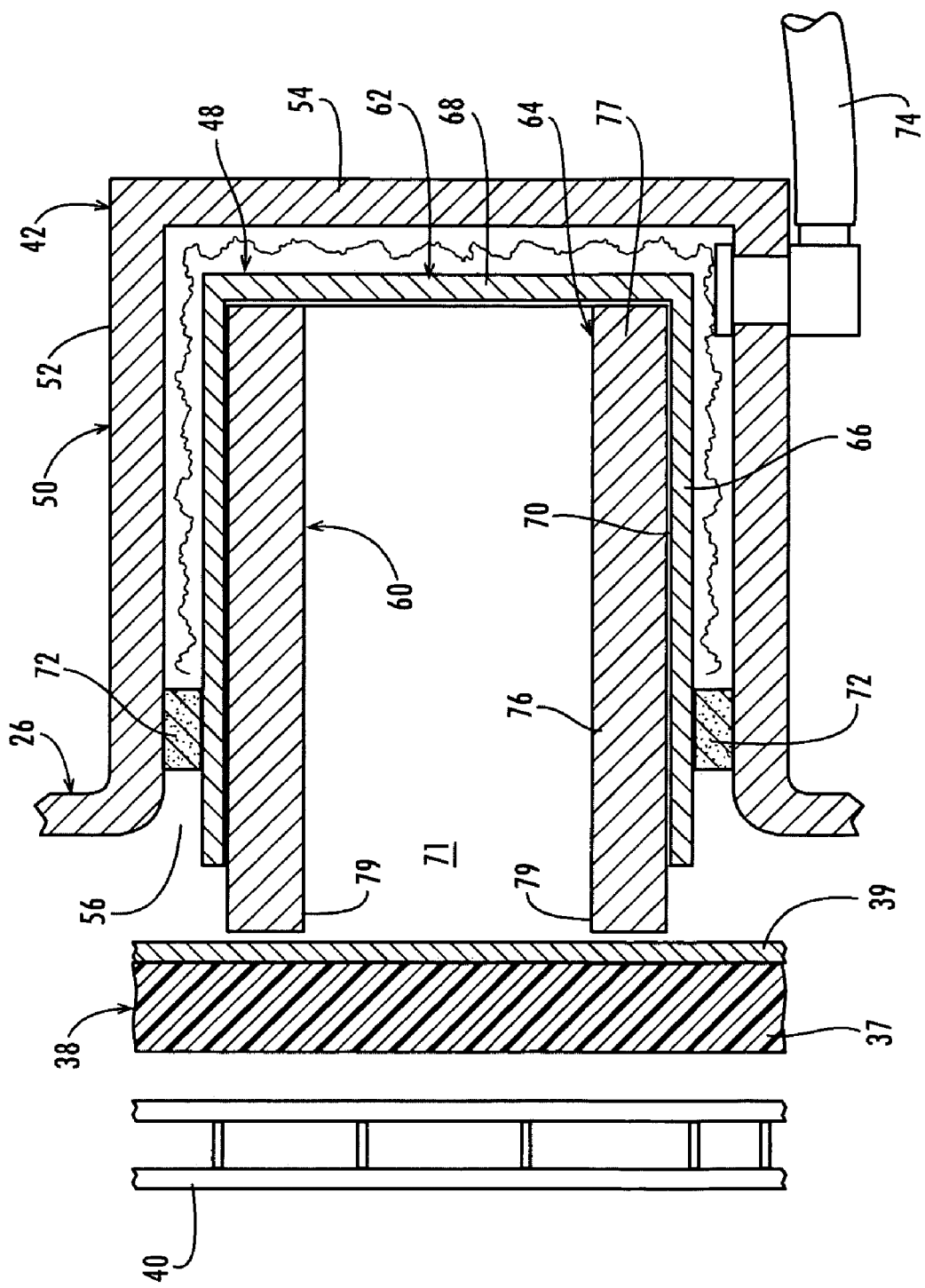
FIG. 2 is a cross-sectional illustration of the brake actuator.

As illustrated in FIG. 2, the actuator housing 42 protrudes from the brake caliper 26, having a housing 50 with a cylindrical side wall 52 and a base wall 54. The cylindrical housing 50 has an opening 56 that faces the brake pad 38 and rotor 40.

The bimetallic piston assembly 60 includes a drive element 62 and a contact element 64. In the present embodiment, the drive element 62 is cup-shaped, having a substantially cylindrical side wall 66 and a base wall 68, leaving an open end cavity 70 therein. The open end of the cavity faces the brake pad 38. The drive element 62 is formed of stainless steel or similar high density material that has sufficient strength to function in its capacity of urging the actuator 48 against the brake pad 38, and also having a very smooth durable cylindrical exterior for forming a seal between the actuator and the facing surfaces of the actuator housing. An annular seal 72 is extended between the facing surfaces of the cup-shaped drive element 62 and the side wall 52 of the cylindrical housing 50 of the actuator 48. The typical brake line 74 communicates brake fluid to the space behind the seal as defined by the facing surfaces of the cup-shaped drive element 62 and the actuator housing 42.

The contact element 64 is of open ended cylindrical shape having an annular side wall 76. The inner or proximal end 77 of the annular side wall 76 of the contact element engages the bottom wall 68 of the cup-shaped drive element 62, and the outer or distal end 79 of the contact element 64 protrudes from the cup-shaped drive element and is engageable with the rigid backing plate 39 of the brake pad 38.

Preferably, the contact element 64 is fabricated of aluminum or of other metal that has a high heat transfer rate. Also, while it is preferred that the exterior size and shape of the contact element corresponds to the size and shape of the interior surfaces of the cup-shaped cavity of the drive element so that it can be press fit into the interior of the drive element, it is possible that the elements 62 and 64 be of other sizes, including a size that allows a layer of insulation to be interposed between the contact element and the drive element It will be noted that the thickness of the cylindrical wall of the contact element 64 is much greater than the thickness of the cylindrical wall of the cup-shaped drive element 62. It is desired to have the contact element of high rate of heat transfer be of larger volume than the volume of the drive element which has a lower heat transfer rate. For example, it is desired that the wall thickness of the contact element 64 be at least five times greater than the wall thickness of the drive element 62 for efficiency of heat transfer and durability, but other thickness ratios can be used. For example, greater ratios of high heat transfer material to lower heat transfer materials tend to provide faster heat dissipation, particularly for dissipation of heat from the contact element away from the drive element.

In operation, when brake fluid is moved under pressure inside the actuator housing 42, the bimetallic piston 60 is urged by the fluid away from the base wall 54 of the actuator housing 50 toward the brake caliper 38. The bimetallic piston 48 moves against the brake pad 38, forcing the brake pad into frictional contact with the rotor 40, applying drag to the rotor and slowing its rotary movement.

As the brakes continue to operate in this manner, heat is generated from the friction between the rotor 40 and the brake pad 38, and the heat is transmitted from the steel backing plate 39 of the brake pad to the bimetallic piston 48. Since the sleeve shaped contact element 64 is in direct contact with the backing plate 39 of the brake pad, the heat of conduction passes from the backing plate of the brake pad into the contact element 64. Since the contact element 64 has a relatively high rate of heat transfer, it easily absorbs the heat from the brake pad, and it easily gives up the heat to the surrounding atmosphere. For example, the turbulence of air about the brake assembly tends to readily remove the heat from the contact element 64, particularly from the working end of the contact element that engages the brake pad. Further, when the brakes are relieved and the bimetallic piston 60 retracts into its actuator housing 42, there usually is some separation between the brake pad 38 and the contact end 80 of the contact element 64, allowing the turbulent air to move into and about the internal cylindrical surface of the side wall 76 of the contact element 64. This tends to have a rapid cooling effect on the contact element, particularly when the contact element is made of a high heat transfer material such as aluminum.

In the meantime, the drive element 62 remains in a relatively cool condition because of the extraction of heat from the brake assembly by the contact element 64. In addition, the relatively low temperature condition of the drive element 62 tends to avoid rapid deterioration of the seal 72. Also, since the drive element 62 is fabricated of stainless steel or a similar rigid structure, the thickness of the drive element can be minimized and the thickness of the contact element can be maximized. This tends to enhance the ability of the bimetallic piston to remove heat from the brake before the heat manages to transfer to the brake fluid.

When the bimetallic piston 60 is first constructed, the cup-shaped drive element 62 is formed by stamping of stainless steel sheet material, and the contact element 64 is formed by cutting tubular stock of aluminum to the desired length. The tubular stock of aluminum is pressed fit into the interior cavity of the drive element 62. Thus, the drive element and contact element move in unison during the operation of the brake assembly.

The smooth exterior surface of the stainless steel drive element 62 enhances piston movement through the seal 72 and withdrawal of the piston after the pressure of the braking function is relieved, so that the bimetallic piston 60 can withdraw away from the brake pad.

Preferably, the bimetallic piston 60 is combined with a caliper 26 that is formed of aluminum. This combination of elements formed of aluminum enhances the ability of the brake assembly to shed heat rapidly, thereby prolonging the life of the brake assembly. The facing base walls and side walls of the drive element and actuator housing, together with the annular seal 72 extending therebetween, form a pressure chamber for receiving brake fluid. The backing plate of the brake pad is formed of steel, so that the aluminum contact element 64 has a greater heat transfer capacity than the backing plate.

The open ended configuration of the cylindrically shaped contact element 64 leaves the base wall 68 of the drive element open for cooling.

Although a preferred embodiment of the invention has been disclosed in detail herein, it will be obvious to those skilled in the art that variations and modifications of the disclosed embodiment can be made without departing from the spirit and scope of the invention as set forth in the following claims.

What is claimed is:

1. A disc brake assembly for engaging and decreasing the speed of rotation of a rotor of a wheel, including a caliper with an actuator housing, at least one brake pad mounted in said caliper for engaging the rotor, and an actuator positioned in the actuator housing for urging the brake pad into engagement with the rotor, comprising:
    said actuator comprising a piston assembly including a drive element and a contact element,
    said drive element defining a cup-shaped recess with a side wall having a cylindrical interior surface and opposed ends, with a base wall closing one of said ends and an opening at the other of said ends, with said opening facing said brake pad,
    said contact element having a cylindrically shaped exterior surface received through said opening of said drive element into said recess and extending from said base wall and along said cup shaped recess toward engagement with the brake pad,
    said contact element consisting essentially of aluminum for engaging the brake pad, and
    said drive element consisting essentially of steel and configured for urging said contact element toward engagement with the brake pad.

2. The disc brake assembly of claim 1, wherein:
    said contact element engages said bottom wall of said drive element,
    said bottom wall including a surface facing the actuator housing and forming with said actuator housing a pressure chamber for receiving brake fluid.

3. The disc brake assembly of claim 2, wherein said cylindrically shaped exterior wall surface of said contact element is in contact with the cylindrical interior surface of said drive element.

4. The disc brake assembly of claim 1, wherein said contact element is seated against said recess of said drive element and protrudes from said recess for contact with the brake pad.

5. The disc brake assembly of claim 1 and further including a seal between said drive element and said actuator housing.

6. The disc brake assembly of claim 1 and wherein said brake pad comprises a rotor-engaging pad and a metal backing plate, and said contact element is arranged to engage said metal backing plate and to dissipate heat from said brake pad.

7. The disc brake assembly of claim 1, wherein said contact element is open-ended and is press fit into said recess of said drive element, the side wall of said contact element being thicker than the side wall of said drive element.

8. A disc brake assembly for engaging and decreasing the speed of rotation of a rotor, including a caliper with an actuator housing for mounting about a rotor and an actuator positioned in said actuator housing for urging a brake pad into engagement with the rotor,
    said actuator including a drive element reciprocally positioned in said actuator housing and including a recess therein defined by a side wall and a base wall with said recess facing said brake pad,
    an open ended contact element extending along said side wall of said drive element and having one open end seated against the base wall of said recess for movement in unison with said actuator and in heat exchanging engagement with said recess,
    the other open end of said contact element protruding from within said recess of said drive element toward the brake pad and movable with said drive element for engagement with the brake pad,
    said contact element being formed of material having a first rate of heat transfer and said drive element being formed of a material having a second rate of heat transfer that is lower than said first rate of heat transfer.

9. The disc brake assembly of claim 8, wherein said contact element is cylindrical.

10. The disc brake assembly of claim 9, wherein said drive element is formed of a metal consisting essentially of steel, and said contact element is formed of a metal consisting essentially of aluminum.

11. The disc brake assembly of claim 10, wherein said drive element and said actuator housing form therebetween a brake fluid reservoir.

12. The disc brake assembly of claim 8, wherein said contact element engages said side wall of said drive element.

13. The disc brake assembly of claim 8, wherein said contact element and said drive element have complementary facing shapes along the side wall of the drive element that engage each other.

14. The disc brake assembly of claim 8, wherein said drive element is cup-shaped and defines said recess and said contact element has an external shape that fits said recess.

15. The disc brake assembly of claim 14, wherein said contact element is in frictional contact with the entire recess of said actuator element.

16. A disc brake assembly for engaging and decreasing the speed of rotation of a rotor, including a caliper with an actuator housing for mounting about a rotor and an actuator positioned in said actuator housing for urging brake pads into engagement with the rotor, said brake pads including a pad for engaging a rotor and a steel backing plate superposed said pad, said actuator having a drive element and a contact element, said contact element formed of a material of greater heat transfer capacity than said backing plate, said drive element is cup-shaped with a cylindrical wall and a bottom wall, said contact element is an open-ended tubular shape with an annular side wall press fitted into said cup shape of said drive element and an open end for engagement with the steel backing plate of said brake pad.

17. The disc brake assembly of 16, wherein said contact element and said drive element have facing surfaces that are in snug contact with each other.

18. A disc brake assembly for engaging and decreasing the speed of rotation of a rotor of a wheel, including a caliper with an actuator housing, at least one brake pad mounted in said caliper for engaging the rotor, an actuator positioned in the actuator housing for urging the brake pad into engagement with the rotor, said actuator comprising a piston assembly including drive element including a side wall and a bottom wall defining a recess facing said brake pad, and a contact element received in said recess and in conductive heat exchange relationship with said side wall and said bottom wall of said drive element and extending from said recess toward engagement with the brake pad, said contact element consisting essentially of aluminum for engaging the brake pad, said drive element consisting essentially of steel and configured for urging said contact element toward engagement with the brake pad, and said contact element is cylindrical and open ended.

* * * * *